W. H. RICHTER.
CONDENSER UNIT AND METHOD OF MAKING THE SAME.
APPLICATION FILED JULY 14, 1919.

1,351,787.

Patented Sept. 7, 1920.
2 SHEETS—SHEET 1.

WITNESS
Gustav Genzlinger

INVENTOR.
William H. Richter
by Cornelius D. Ehret
his Attorney

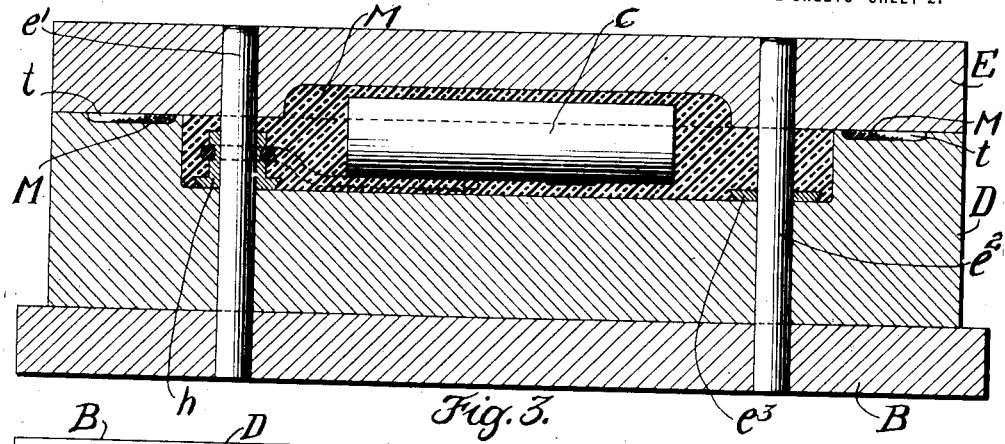
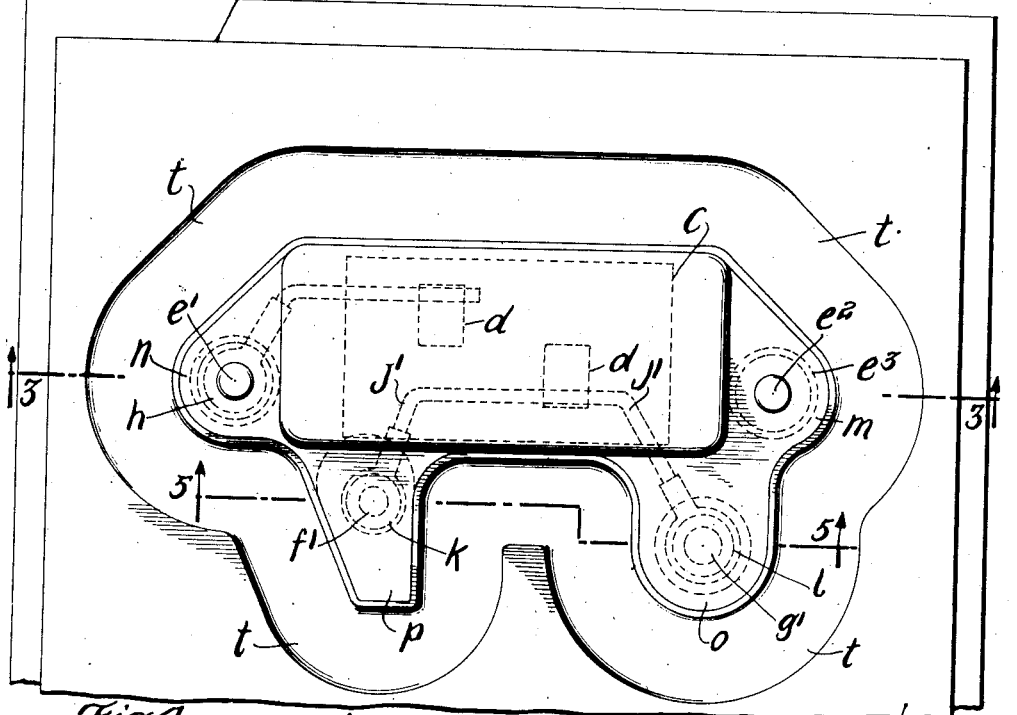
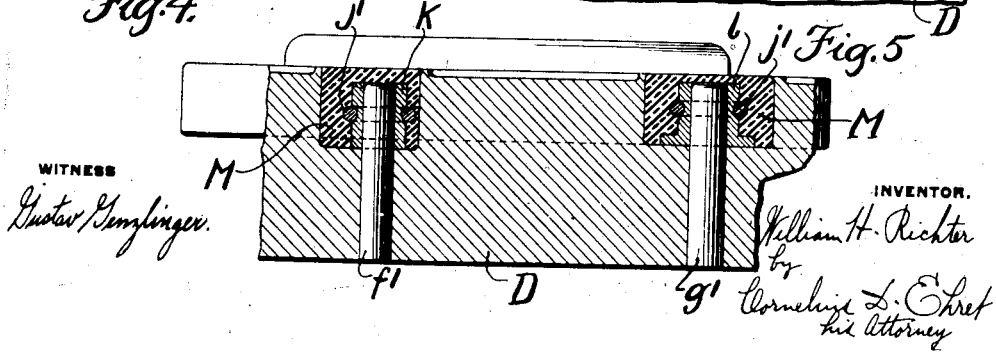

UNITED STATES PATENT OFFICE.

WILLIAM H. RICHTER, OF PHILADELPHIA, PENNSYLVANIA, ASSIGNOR TO ARTHUR ATWATER KENT, OF ARDMORE, PENNSYLVANIA.

CONDENSER UNIT AND METHOD OF MAKING THE SAME.

1,351,787.   Specification of Letters Patent.   Patented Sept. 7, 1920.

Application filed July 14, 1919. Serial No. 310,796.

*To all whom it may concern:*

Be it known that I, WILLIAM H. RICHTER, a citizen of the United States, residing in the city and county of Philadelphia, State of Pennsylvania, have invented new and useful Improvements in Condenser Units and Methods of Making the Same, of which the following is a specification.

My invention resides in a condenser unit comprising a condenser, whose armatures and dielectric may be of any suitable materials, embedded or molded within a solid coating or housing of insulating material, forming a rigid unit, suitable metallic or conducting parts being embedded in and held by the insulating material and connected to the condenser armatures.

More particularly my invention resides in a condenser unit of the character referred to utilizable in electric ignition apparatus, the rigid unit of insulating material containing the condenser serving also to support a part or parts coöperating electrically with the condenser itself.

My invention resides also in the method of producing a condenser unit of the character described.

For an illustration of one form of my condenser and for an understanding of a method of producing the same, reference is had to the accompanying drawings, in which;

Fig. 3 is a vertical sectional view, on the line 3—3 of Fig. 4, through a mold showing the condenser embedded in the insulating or coating material.

Fig. 4 is a plan view of the structure of Fig. 3 with the top mold element removed.

Fig. 5 is a fragmentary sectional view taken on the line 5—5 of Fig. 4.

Figure 1:
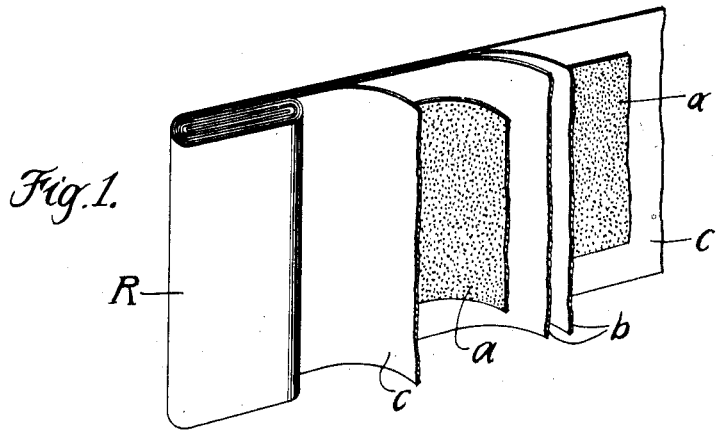
Figure 1 is a perspective view of the condenser.

The condenser itself may be of any suitable structure and material; for example, it may comprise the tin foil or other conducting armatures $a$, $a$, in long strip or ribbon form, separated by one or any suitable number of layers or strips of dielectric material $b$, as of paper, fabric, or any other suitable material, and backed by any suitable sheets $c$ of fabric, paper or other suitable material. These strips laid in the order indicated, may be rolled up into the roll or form indicated at R, whereby the conducting armatures are in close relation to each other but completely insulated from each other. A completed rolled condenser is indicated at C, Fig. 2, having the thin sheet copper or other terminal strips $d$, $d$ connected, respectively, to the different armatures $a$, $a$ of Fig. 1. The condenser roll is placed upon the plate A, Fig. 2, in the position indicated. Extending normally to the surface of the plate A are the pins $e$, $f$ and $g$. Over the pin $e$ is slipped the metallic ferrule or insert $h$ having a peripheral groove $i$, Fig. 7, around which is passed the flexible or braided conductor $j$ soldered or otherwise connected with one condenser terminal $d$. The conductor $j$ is soldered to the button or insert $h$, which is accordingly not only electrically connected to one armature of the condenser, but is held in suitable position with respect to the condenser C. Similarly, the second condenser terminal $d$ is connected to a second flexible or braided conductor $j^1$ which is similarly soldered to metallic inserts or buttons $k$ and $l$, previously slipped over the pins $f$ and $g$, respectively. The three inserts are not only connected to the condenser armatures, but are also suitably positioned for molding.

Figure 2:
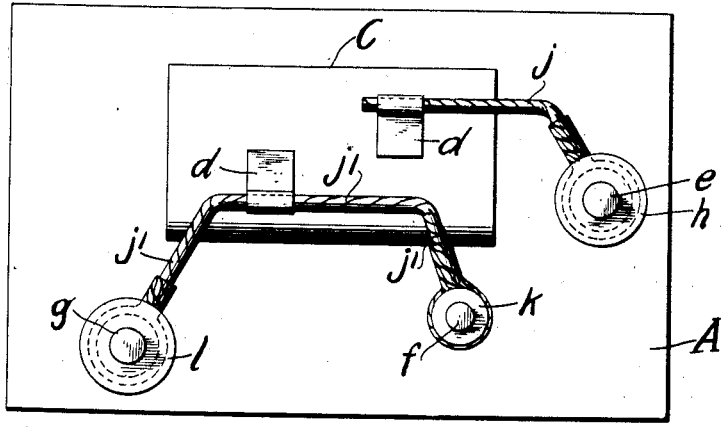
Fig. 2 is a plan view of a structure employed in relating terminals to the condenser.

The condenser with its attached terminals and the inserts indicated in Fig. 2 are now removed by lifting the same upwardly off of the pins $e$, $f$ and $g$ and placed in the mold structure illustrated in Figs. 3 to 5 inclusive. The mold comprises the metal bottom plate B, the principal mold member or matrix D and the top or cover mold member E. Secured to the bottom plate B are the pins $e^1$ and $e^2$, extending through registering holes in the mold members D and E. The mold member D carries the pins $f^1$ and $g^1$, Figs. 4 and 5, extending upwardly into the mold form in the member D. In the member D is formed a cavity of the shape and size of the desired completed unit, the cover E in the instance illustrated also having a cavity to form part of the completed unit. In the member D surrounding the mold form proper is the trough $t$ to receive the overflow of material M. With the cover E removed the condenser structure with attached terminals and inserts as shown in Fig. 2 is placed in the mold or member D by passing the insert $h$ over the pin $e^1$, the insert $k$ over the pin $f^1$ and the insert $l$ over the pin $g^1$, these pins occupying the same relative positions as the pins $e$, $f$ and $g$ of Fig. 2. The parts then occupy the position indicated in dotted lines in Fig. 4.

An additional insert $e^3$, Figs. 3 and 4, as a metal washer, with beveled edge, is slipped over the pin $e^2$.

Suitable material M is disposed within the mold structure beneath and around the condenser C, the top plate or mold member E placed in position and the structure then subjected to pressure, or preferably to heat and pressure, to cause the moldable material M to flow and be compressed into a solid unit completely housing the condenser C and holding in perfectly definite or predetermined position the various inserts referred to, some of which maintain electrical connection with armatures of the condenser.

Properly completely to house the condenser in the material M, it is desirable first to place some of the material, either in powdered form or in the plastic or sheet form, aggregating sufficient quantity to form a layer of the desired depth, in the bottom of mold D beneath the body of condenser C. The condenser and its connections are then placed in the mold as described above, the inserts $h$, $e^3$, $k$ and $l$ resting on the bottom of the mold. More material is then placed in the mold and the top plate E placed in position.

The material M may be a phenolic condensation product, or equivalent, as bakelite, condensite, etc., either in so-called plastic condition i. e., sheet form, or in the powdered condition as may be desired. Where the material M is in the powdered form the depth of the mold will be greater than in the case where the so-called plastic form is employed, because the powder necessary occupies before melting and compression greater volume than the plastic form.

By the effect of heat the material described melts and upon application of pressure and heat is cured or modified to form a solid, stable, rigid, perfectly continuous housing or envelop around the condenser, forming a rigid waterproof unit which may be employed as a mechanical structure, as for example, in connection with interrupter apparatus as disclosed in my copending application Ser. No. 306,850.

By the application of pressure during the molding operation, the condenser structure C is compressed by pressure transmitted to it through the fluid insulating material, bringing the armatures close together, though insulated from each other, and so materially increasing the capacity for a given armature area and thickness and character of dielectric. In a condenser unit of the character referred to employed in ignition apparatus, or elsewhere, this gain in capacity is of great advantage both as to cost and space occupied or dimensions of the final condenser unit. For example, a capacity of approximately .2 micro-farad is attained with an armature, as $a$, one inch wide and forty inches long, the same structure yielding about one-half such capacity when held clamped in the usual way between plates.

Figures 6, 7:
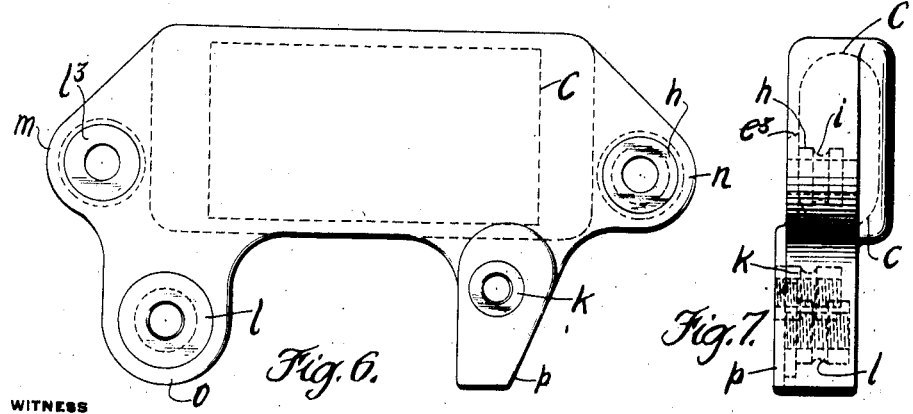
Fig. 6 is a plan view of a finished condenser unit.
Fig. 7 is an end view of the same.

The outline of the condenser unit as shown in Fig. 7 is more or less irregular due to the ears or lugs $m$, $n$, $o$ and $p$, the configuration or outline and thickness being variable and made anything suitable or desirable and in the present instance is of a shape suitable for employment with interrupter apparatus as indicated in my aforesaid application, the insert $l$ in the lug $o$ serving in effect as a binding post, while the insert $k$ in the lug $p$ is adapted to hold one of the members of interrupter mechanism and at the same time effect electrical communication between it and one terminal of the condenser C. The extent and shape of the lug $p$ are such as to form a mechanical support for the interrupter member.

Both inserts $l$ and $k$ are preferably interiorly screw threaded to receive screws which serve to hold in the one case a conducting wire in electrical communication with the insert $l$ and in the other case to hold the interrupter member firmly and accurately to the lug $p$ and at the same time effect electrical communication between the same and one terminal of the condenser D and binding connection $l$.

The inserts $h$ and $e^3$ are in effect metallic reinforcements through which screws may extend into any suitable support to fixedly hold the condenser unit as a whole. When the support is a conducting member connection between the other terminal of the condenser C and such conducting member is effected by the screw which passes through the insert $h$.

In the appended claims the term "rigid" refers to a property of the insulating material enveloping and housing the condenser element, which implies sufficient mechanical strength, hardness and durability to enable the envelop to co-act and function as a mechanical structure or a part thereof, and is to be distinguished from mere solidity, unaccompanied by such mechanical strength, characteristic of paraffin, wax and similar materials.

What I claim is:

1. A condenser unit consisting of a rigid unitary structure of molded insulating material, and a condenser molded in and held compressed solely by said molded insulating material.

2. A condenser unit consisting of a rigid unitary structure of molded condensation product, and a condenser molded in and held compressed solely by said structure.

3. A condenser unit consisting of a rigid unitary structure of molded insulating material, and a previously formed rolled condenser molded in and held compressed solely by said structure.

4. A condenser unit consisting of a rigid unitary structure of molded insulating material, a condenser molded in and held compressed solely by said structure, a conducting insert molded in said structure, and a connection molded in said structure extending between said insert and a terminal of said condenser.

5. A condenser unit consisting of a rigid unitary structure of molded insulating material, a condenser molded in and held compressed solely by said structure, a pair of conducting inserts molded in said structure, and a connection molded in said structure connecting said inserts and a terminal of said conductor.

6. A condenser unit consisting of a rigid unitary structure of molded insulating material, a condenser molded in and held compressed solely by said structure, conducting inserts molded in said structure, and connections molded in said structure extending from said inserts to the different terminals of said condenser.

7. A condenser unit comprising a condenser molded in rigid insulating material, a metallic interiorly threaded insert molded in said material and having an exposed face, and a connection molded in said material extending from said insert to a terminal of said condenser.

8. A condenser unit comprising a condenser molded in rigid insulating material, a metallic insert molded in said material and having a hole extending therethrough in register with a hole in said insulating material extending to a face of said unit, a face of said insert being exposed in an opposite face of said unit.

9. A condenser unit comprising a condenser molded in rigid insulating material, a metallic insert molded in said material and having a hole extending therethrough in register with a hole in said insulating material, and a connection molded in said material extending from said insert to a terminal of said condenser.

10. A condenser unit comprising a condenser molded in rigid insulating material, lugs integral with said unit, and metallic inserts molded in said lugs.

11. A condenser unit comprising a condenser molded in rigid insulating material, a pair of lugs integral with and on the same side of said unit, metallic inserts molded in said lugs, and a connection within said unit connecting said inserts with a terminal of said condenser.

12. The method of producing a condenser unit, which consists in disposing insert members in predetermined position with respect to each other, placing a condenser in predetermined position with respect to said insert members, connecting the terminals of said condenser to said insert members while in such position, placing the condenser and insert members in a mold while held in the same predetermined positions, introducing moldable insulating material, and compressing the same around said condenser and said inserts to form a rigid condenser unit.

13. The method of producing a condenser unit, which consists in disposing insert members in predetermined position with respect to each other, placing a condenser in predetermined position with respect to said insert members, connecting the terminals of said condenser to said insert members while in such position, placing the condenser and insert members in a mold while held in the same predetermined positions, introducing moldable insulating material, and compressing said condenser by applying pressure to said material and causing said material to assume a rigid state.

14. The method of producing a condenser unit, which consists in disposing insert members in predetermined position with respect to each other, placing a condenser in predetermined position with respect to said insert members, connecting the terminals of said condenser to said insert members while in such position, placing the condenser and thereto connected insert members in a mold while held in the same predetermined position, introducing a moldable insulating condensation product, and compressing the same around said condenser, connections and inserts to form a rigid condenser unit.

15. The method of producing a condenser unit, which consists in placing a condenser in a mold, introducing insulating material in solid form into said mold, and applying pressure and heat to compress the condenser and form said insulating material into a unit becoming rigid while under pressure.

16. A condenser unit consisting of a rigid unitary structure of insulating material and a condenser molded in and held compressed solely by said structure.

17. The method of producing a condenser unit, which consists in connecting insert members to the terminals of a condenser, placing the condenser and thereto connected insert members in a mold with said insert members in predetermined position, introducing moldable insulating material, and compressing the same around said condenser and said insert members to form a rigid condenser unit.

In testimony whereof I have hereunto affixed my signature this 10 day of July, 1919.

WILLIAM H. RICHTER.